Dec. 28, 1965  G. OAKES  3,225,692
CYLINDER AND SHAFT RELEASABLE CLUTCH MEANS
Filed Feb. 15, 1963
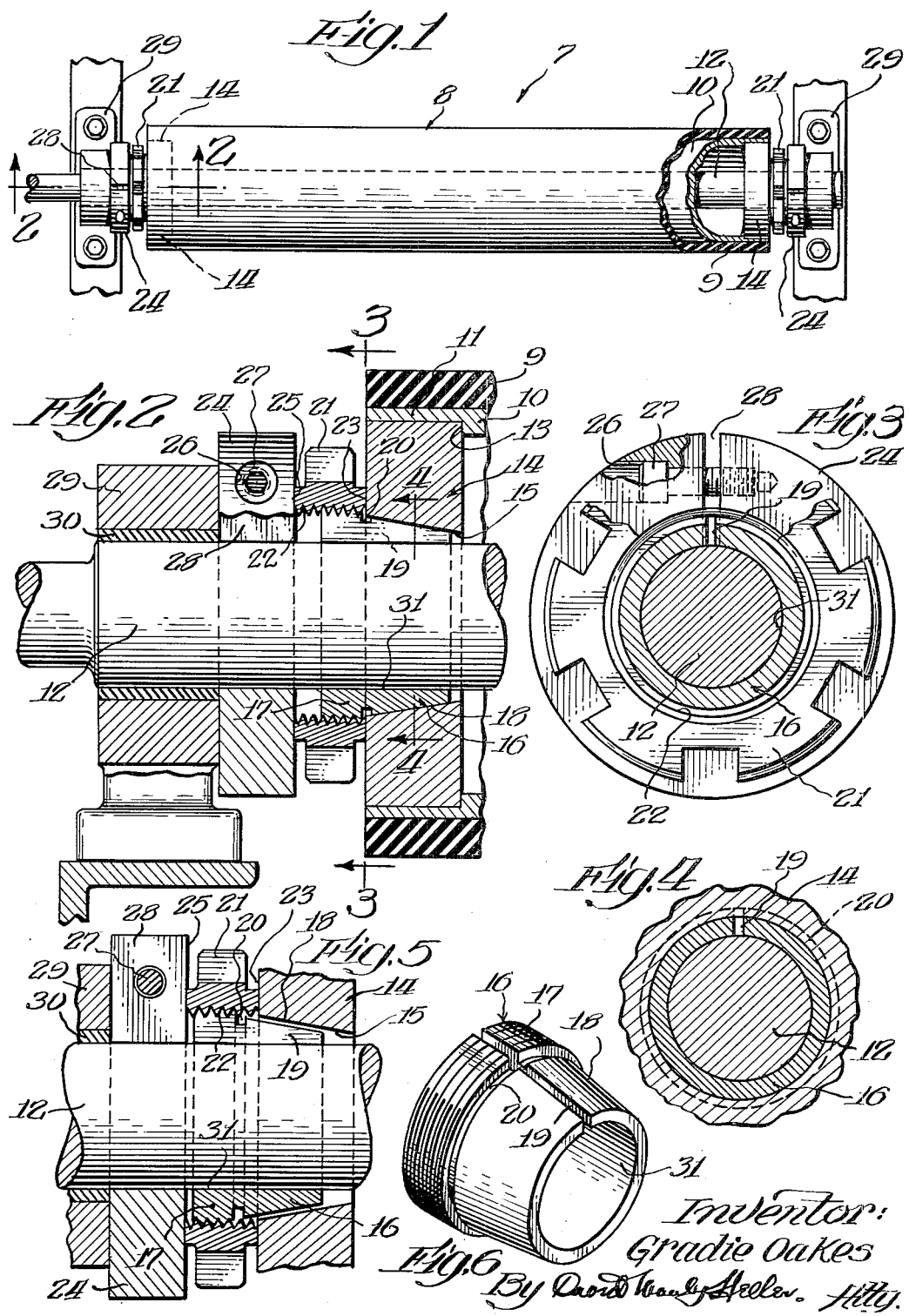
Inventor:
Gradie Oakes

United States Patent Office 3,225,692
Patented Dec. 28, 1965

3,225,692
CYLINDER AND SHAFT RELEASABLE
CLUTCH MEANS
Gradie Oakes, 1200 W. Monroe St., Chicago, Ill.
Filed Feb. 15, 1963, Ser. No. 258,781
3 Claims. (Cl. 101—375)

My invention relates to clutch mechanism adapted to maintain in firm engagement releasably a shaft and a cylinder.

One object of my invention is to provide in a mechanism of the aforementioned character resilient collet means in concert with collar means and spanner nut means which will simultaneously engage a shaft element and a cylinder assembly by means of male and female taper portions.

Another object of my invention is to effectuate the foregoing engagement and disengagement of a shaft and a cylinder by merely operating a spanner nut in opposite directions.

A further object of my invention is to provide in a mechanism of the aforementioned character a collet member having a threaded head portion, a tapered body portion, an axial bore and a longitudinally positioned slot or cut portion to afford slight spring-like action to said body portion.

A still further object of my invention is to provide mechanism of the aforementioned character which when used on opposite ends of a shaft and cylinder assembly will insure true parallel mounting of said assembly with respect to printing press equipment.

A still further object of my invention is to provide mechanism which is simple in construction, efficient in its operation, and which will lend itself to economical quantity production.

Other and ancillary objects resident in my invention will become readily apparent by reference to the accompanying drawings and the ensuing description, wherein like numerals are used to designate like parts, and in which:

FIG. 1 is an elevational view of my invention, showing certain portions cut away in section in order to more clearly illustrate the structure thereof.

FIG. 2 is an enlarged and fragmentary longitudinal cross-sectional view taken substantially on line 2—2 of FIGURE 1.

FIG. 3 is a cross-sectional view taken substantially on line 3—3 of FIGURE 2.

FIG. 4 is a fragmentary cross-sectional view taken substantially on line 4—4 of FIGURE 2.

FIG. 5 is a cross-sectional view similar to FIGURE 2 showing the mechanism in inoperative position or in disengagement as compared to FIGURE 2 where the mechanism is shown in engagement.

FIG. 6 is a perspective view of the collet member comprising an important member of my invention.

Referring to the various views, my invention is generally designated 7 consisting of a cylinder 8 having a rubber coating 9 mounted on a hollow tubular member 10 provided with a wall portion 11 which is counterbored at each end to form a seat 13 for an end plug element 14. Said end plug element 14 has a central tapered bore 15 engageable by a male tapered section 18 of a collet element 16.

A shaft 12 of suitable dimension fits snugly into a bore 31 in said collet element 16 which is further provided with a threaded head portion 17, a tapered body portion 18 and a longitudinal slotted portion 19. An undercut relief portion 20 is located between said head portion 17 and said body portion 18 so as to afford free movement of a nut element designated 21 and which is provided with a female threaded portion 22 adapted to engage freely said threaded head portion 17.

A split collar element 24 having a slotted opening 28 is positioned and secured on the shaft 12 in a manner permitting said nut to be operated freely by a spanner wrench, said nut being confined against lateral movement between surfaces 23 and 25 thus resulting in movement of said collet element to the right in engagement, see FIG. 2, or to the left in disengagement, see FIG. 5. Said collar element is threaded, bored and counterbored as shown at 26 in FIG. 3 in order to accommodate a hollow head clamp screw 27. The foregoing assembly may be mounted in bearings 29 of a printing press unit, the bearings customarily being equipped with bushings 30 for wear replacement.

In practice, for purposes of ready interchangeability of shaft and cylinder assemblies, one end may remain permanently attached, whereas the other end mechanism may be disengaged thus permitting the shaft and cylinder assembly to be removed and replaced. Although bearings 29 have been indicated merely to show an exemplary method of mounting, yet in machines in which assemblies of shaft and cylinder are employed are equipped with bearings which permit ready and speedy interchangeability, such as split bearings, or bearings with removable caps. The bearings illustrated are not material to the invention disclosed.

In operation after an assembly is positioned in suitable bearings the split collars 24 are each positioned so as to afford easy rotational movement to the nuts 21 which when engaged by a spanner wrench are rotated in a direction (looking at FIG. 2) so as to cause collet element 16 by virtue of its tapered surface 18 to engage firmly the tapered bore 15, the engagement of the tapers in concert with the spring-like structure of said collet 16 and its slotted portion 19 which produces a constriction of the conical surface 18 of element 16 simultaneously causes its bore 31 to be slightly reduced in diameter to clutch tightly the surface of shaft 12, the result being that the shaft and cylinder are integrated to operate together.

By reversing rotation of nut 21 in a direction contra to that used in FIG. 2, the disengagement of tapered portions 15 and 18 takes place, the bore 31 becomes slightly enlarged, or returns to normal size thus freeing the shaft 12 from collet 16 and simultaneously freeing collet 16 from end plug 14 of cylinder 10, as shown in FIG. 5.

It should be noted that with the use of my invention on each end of a cylinder and shaft assembly a true parallel relationship can be established with a sheet material feeding mechanism, since by virtue of the conical portions of the collet elements on both ends, an exact and equal movement inwardly is afforded both collet elements and hence the result is true parallelism. Because the nut elements 21 are confined against lateral movement, the collet elements 16 are caused to move laterally in engagement or disengagement dependent on the direction of rotation of said nut elements 21.

Although, I have herein described my invention, and disclosed the operation and advantages thereof, it should be understood that the disclosure is purely exemplary, and any modifications or improvements of which it is susceptible, without departure from the scope of my invention, are intended as embracing said disclosure, my invention is not to be limited thereto.

Having thus disclosed and described my invention, what I claim as novel and desire to secure by Letters Patent of the United States is:

1. Releasable clutch means of the character described comprising, a shaft arranged to operate in bearings, a hollow cylinder positioned concentrically on said shaft and provided with frusto-conical bores at each of its ends, collar elements secured to said shaft and spaced with respect to said ends, resilient collet means slidably fitted on said shaft and provided with a frusto-conical body portion adapted to engage said frusto-conical bores, and further provided with a threaded portion and a longitudinal slotted portion, and nut means confined against lateral movement and threadably secured to said threaded portion which when rotated in one direction will cause integration of said shaft and cylinder.

2. Releasable clutch means of the character described comprising, a shaft member rotatably mounted, a hollow cylinder positioned so as to be secured concentrically with respect to said shaft member and provided with frusto-conical bores at each of its ends, collar means secured to said shaft member in spaced relationship with each of said ends, and resilient collet means integrating said shaft member and said hollow cylinder positioned on said shaft member between the confines of said collar means and each of said ends, and provided with frusto-conical body portions engaging simultaneously said frusto-conical bores, said frusto-conical body portions being slotted longitudinally so as to grip firmly said shaft member while said frusto-conical body portions engage said frusto-conical bores, said resilient collet means having a threaded head portion, and a nut element threadably secured to said threaded head portion and confined against lateral movement rotatably between said collar means and said ends for effecting engagement and disengagement of said resilient collet means dependent on the direction of rotation of said nut element.

3. Releasable clutch means of the character described comprising, a shaft member rotatably mounted, a hollow cylinder positioned so as to be secured concentrically with respect to said shaft member and provided with frusto-conical bores at each of its ends, split collar means secured to said shaft member in spaced relationship with each of said ends, and resilient collet means integrating said shaft member and said hollow cylinder positioned on said shaft member between the confines of said collar means and each of said ends, and provided with frusto-conical body portions engaging simultaneously said frusto-conical bores, said frusto-conical body portions being slotted longitudinally so as to grip firmly said shaft member while said frusto-conical body portions engage said frusto-conical bores, said resilient collet means having a threaded head portion, and a nut element threadably secured to said threaded head portion and confined against lateral movement rotatably between said collar means and said ends for effecting engagement and disengagement of said resilient collet means dependent on the direction of rotation of said nut element.

References Cited by the Examiner
UNITED STATES PATENTS

| 1,712,087 | 5/1929 | Medholdt | 29—129 X |
| 1,891,405 | 12/1932 | Ericksson | 101—375 |
| 2,918,867 | 12/1959 | Killary et al. | 101—375 |

FOREIGN PATENTS 318,079   8/1929   Great Britain.

EUGENE R. CAPOZIO, *Primary Examiner.*

WILLIAM B. PENN, *Assistant Examiner.*